(12) United States Patent
Hashimoto et al.

(10) Patent No.: US 8,283,272 B2
(45) Date of Patent: Oct. 9, 2012

(54) DIELECTRIC CERAMIC COMPOSITION

(75) Inventors: Shinsuke Hashimoto, Tokyo (JP);
Masato Konno, Tokyo (JP); Momoyo Nitta, Tokyo (JP); Tomohiro Yamashita, Tokyo (JP); Hiroshi Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 31 days.

(21) Appl. No.: 12/913,370

(22) Filed: Oct. 27, 2010

(65) Prior Publication Data

US 2011/0118104 A1     May 19, 2011

(30) Foreign Application Priority Data

Nov. 17, 2009 (JP) .................... 2009-262172

(51) Int. Cl.
*C04B 35/468* (2006.01)

(52) U.S. Cl. ........................ 501/138; 501/139

(58) Field of Classification Search ............ 501/137, 501/138, 139
See application file for complete search history.

(56) References Cited

U.S. PATENT DOCUMENTS 7,220,691 B2 *  5/2007  Nonaka et al. ............ 501/139
7,273,825 B2 *  9/2007  Muto et al. ................ 501/138
2007/0142210 A1  6/2007  Muto et al.

FOREIGN PATENT DOCUMENTS

| JP | 06-215979 | | 8/1994 |
| JP | 200034166 | * | 2/2000 |
| JP | 2002-050536 | | 7/2000 |
| JP | 2005104772 | * | 4/2005 |
| WO | WO 2006/018928 A1 | | 2/2006 |

* cited by examiner

*Primary Examiner* — Karl Group
(74) *Attorney, Agent, or Firm* — Muncy, Geissler, Olds & Lowe, PLLC

(57) ABSTRACT

A purpose of the present invention is to provide a dielectric ceramic composition which is available to obtain a multilayer ceramic capacitor having a high specific permittivity and a small temperature change of capacitance. A dielectric ceramic composition comprises a dielectric main component composed of 86.32 to 97.64 mol % of $BaTiO_3$, 0.01 to 10.00 mol % of $Y_2O_3$ and 0.01 to 10.00 mol % of MgO and 0.001 to 0.200 mol % of $V_2O_5$, 0.01 to 1.0 mol % of more than one kind of a first additive selected from a group composed of MnO, $Cr_2O_3$, $Co_2O_3$, 0.5 to 10.0 mol % of a second additive which is $\{Ba\alpha, Ca(1-\alpha)\}SiO_3$ (note, $0 \leq \alpha \leq 1$), and Sr: 10 to 500 ppm, S: 10 to 50 ppm, Al: 10 to 50 ppm, Fe: 10 to 50 ppm, Zr: 100 to 800 ppm, Y: 10 to 100 ppm, Hf: 10 to 100 ppm to 100 parts by weight of $BaTiO_3$.

1 Claim, No Drawings

DIELECTRIC CERAMIC COMPOSITION

BACKGROUND OF THE INVENTION

1. Field of the Invention

The present invention relates to a dielectric ceramic composition which is available to obtain a multilayer ceramic capacitor having particularly high specific permittivity and small temperature change of capacitance.

2. Description of the Related Art

In recent years, with rapid technical advance of electric apparatuses, electronic circuits have been rapidly downsized and complicated. Therefore, it is required to further downsize and to have higher performance for electronic components. Namely, in order to keep good temperature characteristic and capacitance even though downsized, the dielectric ceramic composition and electronic components having high specific permittivity are required.

As for the dielectric ceramic composition used for a ceramic capacitor and the like, a high specific permittivity type such as barium titanate ($BaTiO_3$) and the like is known. In the composition like this, although it is available to enlarge a specific permittivity, a temperature change rate of capacitances is large.

As for manufacturing methods of barium titanate ($BaTiO_3$), generally, the liquid phase methods such as an oxalate method, an alkoxide method, a hydrothermal synthesis method and the like, and a solid phase method wherein raw material powder is reacted are well known. However, in a barium titanate obtained by the liquid phase method, there is a residual hydroxyl group (OH group) which is derived from a reaction type. Although it is possible to remove the OH group by performing heat treatment, a barium titanate having excellent electric property cannot be obtained, because holes are generated in a particle when removing the OH group. Dielectric particles obtained by the solid phase method have no deficiency and an excellent dielectric characteristic is expected. On the other hand, however, the dielectric characteristic such as a specific permittivity and a temperature change rate of capacitances are not improved than it is expected, because a crystallinity does not become sufficiently high.

Therefore, in order to improve the dielectric characteristic such as the specific permittivity, temperature change rate of capacitances and the like, various examination have been carried out with respect to a manufacturing method and composition of the dielectric ceramic composition.

In Patent Document 1 (Japanese Patent Laid Open No. H06-215979), it discusses a composition for the dielectric ceramic composition. Specifically, in Patent Document 1, it suggests a dielectric ceramic composition comprising a dielectric main component composed of; 86.32 to 97.64 mol of $BaTiO_3$, 0.01 to 10.00 mol of $Y_2O_3$, 0.01 to 10.00 mol of MgO and 0.001 to 0.200 mol of $V_2O_5$, 0.01 to 1.0 mol % of more than one kind of an arbitrary first additive selected from a group composed of MnO, $Cr_2O_3$, $CO_2O_3$, and 0.5 to 10.0 mol % of an arbitrary second additive which is $\{Ba\alpha, Ca(1-\alpha)\}SiO_3$ (note, $0 \leq \alpha \leq 1$).

However, in a real situation in which downsizing and high performance are required, further improvement of the dielectric characteristics is still required, even by the dielectric ceramic composition of the Patent Document 1.

Therefore, a purpose of the present invention is to provide a dielectric ceramic composition which is available to obtain a multilayer ceramic capacitor having high specific permittivity and small temperature change of capacitance.

In order to solve the above problems, according to a keen examination by the present inventors, the inventors reached to accomplish the present invention by finding that a dielectric ceramic composition having high specific permittivity and small temperature change of capacitance can be obtained by adding specific amount of sub components to the dielectric ceramic composition described in Patent Document 1.

Namely, a dielectric ceramic composition according to the present invention comprises;

a dielectric main component composed of 86.32 to 97.64 mol % of $BaTiO_3$, 0.01 to 10.00 mol % of $Y_2O_3$ and 0.01 to 10.00 mol % of MgO and 0.001 to 0.200 mol % of $V_2O_5$, 0.01 to 1.0 mol % of more than one kind of a first additive selected from a group composed of MnO, $Cr_2O_3$, $CO_2O_3$, 0.5 to 10.0 mol % of a second additive of which is $\{Ba\alpha, Ca(1-\alpha)\}SiO_3$ (note, $0 \leq \alpha \leq 1$), and Sr: 10 to 500 ppm
S: 10 to 50 ppm
Al: 10 to 50 ppm
Fe: 10 to 50 ppm
Zr: 100 to 800 ppm
Y: 10 to 100 ppm
Hf: 10 to 100 ppm with respect to 100 parts by weight of $BaTiO_3$.

In accordance with the present invention, the dielectric ceramic composition which is available to obtain a multilayer ceramic capacitor having high specific permittivity and small temperature change of capacitance is provided.

Below, the present invention will be specified further precisely including the best mode.

The dielectric ceramic composition according to the present invention comprises;

a dielectric main component composed of $BaTiO_3$, $Y_2O_3$, MgO and $V_2O_5$, more than one kind of a first additive selected from a group composed of MnO, $Cr_2O_3$, $CO_2O_3$, a second additive of $\{Ba\alpha, Ca(1-\alpha)\}SiO_3$ (note, $0 \leq \alpha \leq 1$), and predetermined amounts of Sr, S, Al, Fe, Zr, Y and Hf.

Here, Metal/Oxygen ratios in the $BaTiO_3$, $Y_2O_3$, MgO, $V_2O_5$, MnO, $Cr_2O_3$, $CO_2O_3$ are not strict value, they may be slightly shifted from the stoichiometry.

In the dielectric ceramic composition of the present invention, compositional ratios of $BaTiO_3$, $Y_2O_3$, MgO and $V_2O_5$ to compose the dielectric main component is, 86.32 to 97.64 mol % of $BaTiO_3$, 0.01 to 10.00 mol % of $Y_2O_3$, preferably 0.1 to 5 mol %, further preferably 0.5 to 3 mol %, 0.01 to 10.00 mol % of MgO, preferably 0.1 to 5 mol %, further preferably 0.5 to 3 mol %, 0.001 to 0.200 mol % of $V_2O_5$, preferably 0.005 to 0.1 mol %, further preferably 0.01 to 0.1 mol % with respect to a sum of the dielectric main component, the fist additive and the second additive.

When the composition of the dielectric main component is within the above range, it is possible to provide an excellent multilayer ceramic capacitor wherein the specific permittivity of the obtained dielectric ceramic composition is high and the temperature change of capacitance becomes smaller, further a dielectric loss is decreased, and has high insulation resistance.

The first additive is more than one kind selected from a group comprising MnO, $Cr_2O_3$ and $CO_2O_3$. A compositional ratio of the first additive is preferably 0.01 to 1.0 mol %, preferably 0.05 to 1 mol %, further preferably 0.05 to 0.5 mol % with respect to a sum of the dielectric main component, the first additive and the second additive.

The first additive is blended for controlling the specific permittivity, and in case that the first additive is not used, there is a risk that a dielectric body cannot be obtained, because a sintered body becomes a semi-conductor. Also, when a blending amount of the first additive is excessively high, there is a risk to decrease an insulation resistance.

The second additives is a sintering aid shown by {Baα, Ca (1−α)}SiO₃ (herein after, there are sometimes referred to "BCG" as abbreviation). Here, the "α" is 0 to 1, preferably 0.3 to 0.8. A compositional ratio of the second additive is preferably 0.5 to 10.0 mol %, preferably 0.5 to 5 mol %, further preferably 1 to 5 mol % with respect to a sum of dielectric main component, the first additive and the second additive. The second additive is used for the sintering aid. Therefore, in case that the second additive is not blended, it becomes difficult to produce a sintered body. Also, when a blending amount of the second additive is excessively high, there are risks for increasing the loss of the dielectric, for decreasing the insulation resistance and for deteriorating the temperature characteristic.

The dielectric ceramic composition of the present invention further comprises Sr, S, Al, Fe, Zr, Y and Hf (herein after, these are sometimes referred to "minor components" as abbreviation), in addition to the above mentioned dielectric main component, the first additive and the second additive. A compositional ratio of the minor components are;

Sr: 10 to 500 ppm, preferably 50 to 500 ppm,
S: 10 to 50 ppm, preferably 10 to 30 ppm,
Al: 10 to 50 ppm, preferably 10 to 30 ppm,
Fe: 10 to 50 ppm, preferably 10 to 30 ppm,
Zr: 100 to 800 ppm preferably 300 to 800 ppm,
Y: 10 to 100 ppm, preferably 10 to 50 ppm,
Hf: 10 to 100 ppm, preferably 10 to 50 ppm with respect to 100 parts by weight of BaTiO₃.

Note that, in a compositional amount of the "Y" as minor component, an amount of the "Y" originated from Y₂O₃ included in the main component is not included.

By blending the above mentioned minor components, a dielectric ceramic composition having high crystallinity, densed and high specific permittivity can be provided. Thus, an obtained electronic component has excellent durability and temperature characteristic.

A manufacturing method of the dielectric ceramic composition according to the present invention is not particularly limited, as long as it fulfills the above mentioned composition. For example, the dielectric ceramic composition can be obtained by weighing, blending and sintering raw powders so as to fulfill the above mentioned composition.

Also, a dielectric ceramic composition can be obtained by weighing, blending and calcining the BaTiO₃ as main component and the first additive and/or minor components so that it fulfill a predetermined composition, next a dielectric powder obtained by the calcination is crushed, then adding residual components and the second additive (BCG) and sintered. In particular, in the present invention, it is preferable to produce a dielectric ceramic composition by weighing, blending and calcining the BaTiO₃ as main component and the minor components so that it fulfill a predetermined composition, next a dielectric powder obtained by the calcination is crushed, then adding Y₂O₃, MgO, V₂O₅, the first additives (MnO, Cr₂O₃ and/or Co₂O₃), the second additives (BCG) and a predetermined binder and a solvent to form a paste so as to obtain a green sheet, and sintering.

The dielectric powder which is obtained by weighing the raw material powders so that the BaTiO₃ as main component and the minor components fulfill a predetermined composition and blending, calcining, then crushing to a predetermined particle size preferably comprises a following mentioned property.

Namely, in powder X-ray diffraction patterns of the dielectric powder by using X-ray CuKα ray, a ratio of X-ray strength ($I_b$) at an intermediate point of (200) plane and (002) plane and diffraction line strength I(200) ($I_{(200)}/I_b$, hereinafter referred as "K-value") is 10 to 20, preferably 11 to 20, further preferably 11 to 17. When the K-value is higher, the crystallinity is higher.

A c/a value which is a ratio of the c-axis and the a-axis obtained from X-ray diffractometry is 1.0095 to 1.0110, preferably 1.0100 to 1.0110, further preferably 1.0100 to 1.0107. A dielectric powder wherein the c/a value is within the above mentioned range has an excellent crystallinity, in particular has an excellent tetragonal property.

Also, the above mentioned dielectric powder comprises a dense structure wherein a hole having a diameter of 10 nm or larger in the prime particulate does not substantially exist. Here, the existence of the hole is confirmed by observation by a transmission electron microscope (TEM) of the prime particulate, the "does not substantially exist" means a number of particulate having diameter 10 nm or larger is one or less, as a result of observing 200 prime particulates selected arbitrarily.

Further, a specific surface area of the above mentioned dielectric powder by BET method is preferably 2.0 to 5.5 m²/g, further preferably 2.5 to 5.5 m²/g, more preferably 2.5 to 5.05 m²/g.

Because the above mentioned dielectric powder has high crystallinity and comprises a dense structure wherein a hole does not substantially exist in the particles, a dielectric ceramics having excellent dielectric characteristic can be provided by sintering thereof. Although the above mentioned dielectric powder can be formed into paste as it is, in case that a dielectric layer is formed as thin layer, it may be used by crushing. Since the dielectric powder has high crystalline and density, a damage after crushing is small and has high crystalline and density even after crushing, thus it is possible to contribute to make the dielectric layer having a thin layer. Specifically, it is preferable to use the dielectric powder by crushing until the average particulate is 200 to 450 nm and the like.

Also, when using barium carbonate (BaCO₃) as raw powder of the dielectric powder, it is particularly preferable that unreacted barium carbonate amount in the obtainable dielectric powder is 1.0 wt % or less. Although the unreacted barium carbonate generates gas component when sintering which causes to generate the hole, the generation of the hole during the sintering can be prevented by controlling the unreacted barium carbonate as mentioned above.

The above mentioned dielectric powder is obtained by blending oxide and/or carbonate which are the raw material, and firing the blended powder in which a predetermined amount of the minor components are added if necessary.

Further specifically, the dielectric powder of the present invention can be obtained by heat treating the blended powder composed of titanium dioxide particle, barium carbonate particle and variety of compound particles to realize the aforementioned minor component composition.

For the ratio of the barium carbonate particle and titanium dioxide particle in the blended powder, there will be no problem as long as it is close to the stoichiometry available to generate barium titanate. Thus, Ba/Ti (mole ratio) of the blended powder is good, as long as it is 0.990 to 1.010. When the Ba/Ti exceeds 1.010, the unreacted barium carbonate may remain, and when it is 0.990 or less, the heterogenous phase may be generated.

Also, in addition to the above mentioned titanium dioxide particle and the barium carbonate particle, variety of compound particles for realizing the aforementioned minor component composition is added. Specifically, the compounds which may be the source for Sr, S, Al, Fe, Zr, Y and Hf are added to 100 parts by weight of the generated barium titanate so as to be the aforementioned minor component composition.

As for the compound which becomes the source for the "Sr", strontium carbonate ($SrCO_3$), strontium sulfate ($SrSO_4$) may be mentioned, as for the compound which becomes the source for the "S" source, strontium sulfate ($SrSO_4$) may be mentioned, as for the compound which becomes the source for the "Al" source, $Al_2O_3$ may be mentioned, as for the compound which becomes the source for the "Fe" source, $Fe_2O_3$ may be mentioned, as for the compound which becomes the source for the "Zr" source, $ZrO_2$ may be mentioned, as for the compound which becomes the source for the "Y" source, $Y_2O_3$ may be mentioned, as for the compound which becomes the source for the "Hf" source, $HfO_2$ may be mentioned. Also, it may be conjugated compounds thereof.

A blending method of the blended powder is not particularly limited, and ordinary methods such as a wet method using a ball mill and the like can be adopted. Then, the obtained blended powder is heat treated after drying, thereby a dielectric powder having barium titanate particle as main component can be obtained.

Although the heat treatment condition is not particularly limited, normally, it is favorable in atmosphere at a temperature range 1000° C. to 1100° C. or so for two to four hours. When the firing temperature is too high and the firing time is too long, though crystallinity and density are increased, particulate growth occurs and coarse particle are generated.

The dielectric powder having the obtained barium titanate as a main component is crushed if necessary, then, it is used as an inhibitor which is added to a manufacturing raw material of the dielectric ceramic and a paste for forming an electrode layer. For manufacturing the dielectric ceramics, variety of known means can be adopted without particular limitation. Specifically, the dielectric ceramic composition of the present invention can be obtained by adding predetermined amounts of $Y_2O_3$, MgO, $V_2O_5$, the first additive (MnO, $Cr_2O_3$ and/or $CO_2O_3$) and the second additives (BCG) to the obtained dielectric powder, then adding a predetermined binder and solvent thereto to form the paste, and a green sheet is obtained by using thereof, then firing. Also, as for the preparation of the paste and green sheet, formation of the electrode layer and the firing of the green body, it may be performed by using conventionally known means appropriately.

According to the present invention, the dielectric ceramic composition which is available to obtain a multilayer capacitor having an excellent dielectric constant and a small temperature change of capacitance is provided. Although it is not particularly limited, according to the embodiment of the present invention, it is possible to produce a ceramic capacitor wherein a specific permittivity ∈s is 2800 or more, a dielectric loss (tan δ) is 3% or less, an insulation resistance IR is $1×10^{10}$ or more, a temperature change of a capacitance is ±15% or less within a range of −55 to 125° C.

Below, although the present invention will be specified on the basis of further precise examples, the present invention is not limited to these examples. Note that, in the examples and comparative examples, variety of physical properties are measured as follows.

(Specific Surface Area)

A specific surface area of the dielectric powder obtained by the manufacturing example was measured by BET method. Specifically, it was measured by using NOVA2200 (high speed specific surface area meter) under a condition of the powder amount 1 g, nitrogen gas, one-point method, and holding 15 min at desorption condition 300° C.

(K Value, c/a Value, Barium Carbonate Amount)

The "K" value, the c/a value and remaining barium carbonate amount were measured by X-ray diffractometry for the dielectric powder obtained by the manufacturing example. Specifically, it was measured at Cu-Kα, 40 kV, 40 mA, 2θ:20 to 120 deg by using a fully automated multi-purpose X-ray diffractometry D8 ADVANCE manufactured by BRUKER AXS, and by using one-dimensional high speed measuring apparatus LynxEye, divergence slit 0.5 deg, scattering slit 0.5 deg. Also, the scanning was performed at scan: 0.01 to 0.02 deg, scan speed: 0.3 to 0.8 s/div. For the analysis, Rietveld analysis software (Topas (made by BrukerAXS)) was used.

Note that, the "K" value is defined by a proportional ratio ($I_{(200)}/I_b$) of a peak strength ($I_{(200)}$) of the diffraction line the (200) plane with respect to a strength ($I_b$) at an intermediate point between the angle of peak point of a diffraction line of (200) plane and the angle of a peak point of diffraction line of (002) plane. However, in the X-ray diffraction result, in case the diffraction line is difficult identify, the "K" value was conveniently described as follows.

When the diffraction line of (200) plane and a diffraction line of (002) plane are not clear, it is described as "K" value=1.5, when c/a value is 1.0008 or less and hard to distinguish between tetragonal and cubic, it is described as "K" value=1.0.

(The Dielectric Characteristic Evaluation for the Multilayer Ceramic Capacitor)

With respect to the multilayer ceramic capacitor wherein the stacking number of internal electrode layers is four which are manufactured in the examples and the comparative examples; a specific permittivity "∈s", a dielectric loss (tan δ), an insulation resistance "IR", a temperature characteristic of capacitance "T·C" and "estimate failure rate were evaluated".

Here, the specific permittivity "∈s" and the dielectric loss (tan δ) are values at the temperature 20° C., 1 KHz frequency and 1 Vrms, and the insulation resistance "IR" is a measured value after applying 10V for 30 sec. at the temperature 20° C. The temperature characteristic of capacitance "T·C" is calculated as the ration of the capacitance measured at arbitrary temperature with to the capacitance measured at 25° C., the estimate failure rate" is a failure rate at 85° C., 25V and 1000 hrs predicted from an accelerated aging.

(Producing Example)

By weighing predetermined amounts of titanium dioxide and barium carbonate, the raw material compounds are prepared so that the minor components containing amount becomes Sr 400 ppm, S 30 ppm, A 110 ppm, Fe 10 ppm, Zr 600 ppm, Y 80 ppm and Hf 20 ppm with respect to 100 parts by weight of the obtained barium titanate.

The blended powder was obtained by weighing the above mentioned raw material powder, and wet mixed for 24 hrs by a pot of 1 litter capacity using 2 mm diameter Zirconia ($ZrO_2$) medium, then, dried in a hot air drier at 150° C. The wet mixing was performed under a condition of 50 wt % slurry concentration, and added 0.4 wt % polycarboxylate type dispersing agent.

Next, the temperature of the obtained blended powder was raised to 1060° C. by an electric furnace in an atmosphere pressure, at atmosphere, the temperature rising speed at 3.3°

C./min (200° C./h), and was crushed to a predetermined particle size after firing for 4 hrs. The pulverization was the wet grinding, a target particle size was 0.75 μm at 50% cumulative frequency (D50). The particle size was measured by a laser diffractometry method using MicrotracMT3000II made NIKKISO.

A specific surface area of the obtained dielectric powder was 3.1 m$^2$/g, "K" value was 14, c/a value was 1.0105, remained barium carbonate amount was 0.7 wt %.

EXAMPLES AND COMPARATIVE EXAMPLES (1) The dielectric powder (BaTiO$_3$ base), Y$_2$O$_3$, MgO, V$_2$O$_5$, the first additive (MnO, Cr$_2$O$_3$ and/or Co$_2$O$_3$), the second additive (BCG) were weighed and prepared so that the composition after firing becomes the blending shown in Table 1.
(1) Appropriate amounts of an organic binder and solvent were added, and blended thereof so as to form the enamel.
(2) Painting on a film at the thickness of 6 μm by the doctor blade method to from a green sheet.
(3) The nickel paste is formed, which is material for the internal electrode, to the obtained green sheet by printing.
(4) Four layers of these stacked, and further staking the most upper layer and heat pressed the green sheet to so as to obtain a stacked body.
(5) The obtained stacked body was cut out as 3216 shape which is 3.2×1.6 mm length.
(6) Then, it was stabilized at the temperature 200° C. to 300° C. and performed the treatment for removing the binder for 12 hrs.
(7) Oxygen partial pressure was controlled at 1×10$^{-13}$ to 5×10$^{-9}$ atm, and fired for 2 hrs at stabilizing firing temperature at 1200° C. to 1300° C.
(8) In neutral atmosphere, the oxygen partial pressure was controlled at 2×10$^{-8}$ to 5×10$^{-6}$ atm, and the reoxidation treatment was carried out for 2 hrs while stabilizing at 800° C. to 1100° C.
(9) A specimen capacitor was obtained by attaching the terminal electrodes of indium-gallium (In—Ga) alloy.

With respect to these capacitors, results of the measured specific permittivity "∈s", dielectric loss "tan δ", insulation resistance "IR" (Ω), temperature characteristic of capacitance "TC" (%) and estimate failure rate (ppm) are shown in Table 1.

Note that, a sample to which asterisk* is attached in the table corresponds to a comparative example of the present invention, and an ingredient amount to which the asterisk* is attached departs from a scope defined by the present invention.

TABLE 1

| | composition (mol %) | | | | | | | | | |
|---|---|---|---|---|---|---|---|---|---|---|
| | | | | | BCG | | X | Y | Z | XYZ total |
| | BaTiO3 | Y2O3 | MgO | V2O5 | α | amount | MnO | Cr2O3 | Co2O3 | amount |
| 1 | 95.41 | 0.57 | 1.91 | 0.01 | 0.58 | 1.91 | 0 | 0.19 | 0 | 0.19 |
| 2 | 95.42 | 0.57 | 1.91 | 0 | 0.58 | 1.91 | 0 | 0.19 | 0 | 0.19 |
| 3 | 95.89 | 1.21 | 0.80 | 0.002 | 0.58 | 1.91 | 0 | 0.19 | 0 | 0.19 |
| 4* | 95.93 | 0 | 1.91 | 0.01 | 0.58 | 1.91 | 0.05 | 0.19 | 0 | 0.24 |
| 5* | 96.49 | 0.57 | 0 | 0.01 | 0.58 | 2.74 | 0 | 0.19 | 0 | 0.19 |
| 6 | 94.24 | 2.68 | 0.80 | 0.01 | 0.58 | 1.91 | 0.12 | 0.24 | 0 | 0.36 |
| 7 | 93.91 | 1.07 | 2.89 | 0.03 | 0.58 | 1.91 | 0 | 0.19 | 0 | 0.19 |
| 8 | 89.12 | 0.57 | 8.20 | 0.01 | 0.58 | 1.91 | 0 | 0.19 | 0 | 0.19 |
| 9* | 95.12 | 0.57 | 1.91 | 0.25 | 0.58 | 1.91 | 0.05 | 0.19 | 0 | 0.24 |
| 10 | 86.95 | 9.60 | 1.34 | 0.01 | 0.58 | 1.91 | 0 | 0.19 | 0 | 0.19 |
| 11 | 96.11 | 1.21 | 1.91 | 0.01 | 0.58 | 1.91 | 0 | 0.19 | 0 | 0.19 |
| 12* | 95.60 | 0.57 | 1.91 | 0.01 | 0.58 | 1.91 | 0 | 0 | 0 | 0.00* |
| 13* | 96.27 | 2.68 | 0.80 | 0.01 | 0.58 | 0* | 0.05 | 0.19 | 0 | 0.24 |
| 14 | 95.10 | 0.57 | 1.91 | 0.01 | 0.58 | 1.91 | 0.12 | 0.19 | 0.19 | 0.50 |
| 15 | 93.94 | 1.21 | 1.91 | 0.01 | 0.58 | 2.74 | 0 | 0 | 0.19 | 0.19 |
| 16 | 95.27 | 0.57 | 1.91 | 0.15 | 0.58 | 1.91 | 0 | 0.19 | 0 | 0.19 |
| 17 | 94.38 | 0.57 | 2.89 | 0.01 | 0.58 | 1.91 | 0.24 | 0 | 0 | 0.24 |
| 18* | 94.96 | 1.21 | 1.91 | 0.01 | 0.58 | 1.91 | 0.24 | 0.64 | 0.31 | 1.19* |
| 19* | 97.67 | 11.00* | 0.80 | 0.01 | 0.58 | 1.33 | 0 | 0.19 | 0 | 0.19 |
| 20 | 87.42 | 0.57 | 1.91 | 0.01 | 0.58 | 9.90 | 0 | 0.19 | 0 | 0.19 |
| 21 | 95.09 | 0.01 | 1.91 | 0.01 | 0.58 | 2.74 | 0.05 | 0.19 | 0 | 0.24 |
| 22 | 97.29 | 0.57 | 0.01 | 0.03 | 0.58 | 1.91 | 0 | 0.19 | 0 | 0.19 |
| 23* | 95.60 | 0.57 | 1.91 | 0.01 | 0.58 | 1.91 | 0 | 1.05 | 0 | 1.05* |
| 24* | 97.89 | 0.57 | 1.34 | 0.01 | 0.58 | 11.00* | 0 | 0.19 | 0 | 0.19 |
| 25* | 97.90 | 0.57 | 11.00* | 0.01 | 0.58 | 1.33 | 0 | 0.19 | 0 | 0.19 |
| 26 | 96.52 | 0.57 | 0.80 | 0.01 | 0.58 | 1.91 | 0 | 0.19 | 0 | 0.19 |
| 27 | 93.48 | 2.68 | 1.91 | 0.01 | 0.58 | 1.91 | 0 | 0.01 | 0 | 0.01 |
| 28 | 91.12 | 0.57 | 1.91 | 0.01 | 0.58 | 6.20 | 0 | 0.19 | 0 | 0.19 |
| 29 | 89.67 | 7.42 | 0.80 | 0.01 | 0.58 | 1.91 | 0 | 0.19 | 0 | 0.19 |
| 30 | 95.59 | 0.57 | 1.91 | 0.01 | 0.58 | 1.91 | 0 | 0.01 | 0 | 0.01 |
| 31 | 91.85 | 0.57 | 5.47 | 0.01 | 0.58 | 1.91 | 0 | 0.19 | 0 | 0.19 |
| 32 | 91.71 | 2.68 | 1.91 | 0.01 | 0.58 | 2.74 | 0 | 0.64 | 0.31 | 0.95 |
| 33 | 95.34 | 0.57 | 1.91 | 0.08 | 0.58 | 1.91 | 0 | 0.19 | 0 | 0.19 |
| 34 | 95.41 | 0.57 | 1.91 | 0.01 | 1.00 | 1.91 | 0 | 0.19 | 0 | 0.19 |
| 35 | 95.41 | 0.57 | 1.91 | 0.01 | 0.80 | 1.91 | 0 | 0.19 | 0 | 0.19 |
| 36 | 95.41 | 0.57 | 1.91 | 0.01 | 0 | 1.91 | 0 | 0.19 | 0 | 0.19 |
| 37 | 95.41 | 0.57 | 1.91 | 0.01 | 0.58 | 1.91 | 0 | 0.19 | 0 | 0.19 |
| 38* | 95.60 | 0.57 | 1.91 | 0.01 | 0.58 | 1.91 | 1.05 | 0 | 0 | 1.05* |
| 39* | 95.60 | 0.57 | 1.91 | 0.01 | 0.58 | 1.91 | 0 | 0 | 1.05 | 1.05* |
| 40* | 97.86* | 0.57 | 0.80 | 0.01 | 0.58 | 0.57 | 0 | 0.19 | 0 | 0.19 |
| 41* | 85.78 | 4.32 | 5.47 | 0.15 | 0.58 | 3.85 | 0.24 | 0.19 | 0 | 0.43 |

TABLE 1-continued

| | | | capacitor characteristic | | | |
|---|---|---|---|---|---|---|
| | $\epsilon s$ (−) | tan δ (%) | IR (Ω) | TC −55° C. (%) | TC 125° C. (%) | estimat. failure rate (ppm) |
| 1 | 3400 | 2.7 | 1.80E+10 | 2.2 | −14.3 | 63 |
| 2 | 3600 | 2.8 | 3.00E+10 | 5.1 | −17.0 | 68471 |
| 3 | 3500 | 2.7 | 2.40E+10 | 2.4 | −14.9 | 4622 |
| 4* | 4000 | 4.2 | 3.00E+09 | −1.2 | −6.5 | 16581 |
| 5* | 3800 | 3.6 | 1.20E+10 | −3.7 | −7.5 | 6802 |
| 6 | 3100 | 2.9 | 1.50E+10 | 0.1 | −12.2 | 128 |
| 7 | 3000 | 2.7 | 2.70E+10 | −2.0 | −6.3 | 3 |
| 8 | 2800 | 2.5 | 1.40E+10 | 0.7 | −4.1 | 546 |
| 9* | 2900 | 2.7 | 8.00E+08 | −7.2 | 5.1 | 32960 |
| 10 | 2800 | 2.4 | 2.50E+10 | −1.7 | −4.3 | 173 |
| 11 | 3200 | 3.0 | 1.10E+10 | 6.1 | 13.9 | 4200 |
| 12* | | | | being semi-conductor | | |
| 13* | | | | hard to firing | | |
| 14 | 3000 | 2.8 | 1.20E+10 | −2.4 | −12.0 | 2438 |
| 15 | 2900 | 2.5 | 1.70E+10 | −1.1 | −10.5 | 467 |
| 16 | 3100 | 3.0 | 1.00E+10 | −6.5 | 4.1 | 4709 |
| 17 | 3300 | 3.0 | 2.10E+10 | 1.8 | −11.6 | 15 |
| 18* | 2500 | 2.3 | 7.00E+09 | −2.5 | −6.3 | 10769 |
| 19* | 2100 | 2.0 | 1.80E+10 | −1.4 | −3.5 | 341 |
| 20 | 3600 | 3.0 | 1.20E+10 | 3.5 | −14.2 | 3280 |
| 21 | 3700 | 3.0 | 1.10E+10 | −2.1 | −4.8 | 3924 |
| 22 | 3600 | 2.9 | 1.10E+10 | −1.5 | −6.7 | 2219 |
| 23* | 2800 | 2.7 | 8.00E+09 | −3.1 | −7.8 | 4870 |
| 24* | 4300 | 3.8 | 2.50E+09 | 5.7 | −16.8 | 55978 |
| 25* | 2300 | 2.1 | 1.30E+10 | 2.4 | −5.2 | 689 |
| 26 | 3500 | 2.7 | 1.50E+10 | 1.7 | −9.2 | 851 |
| 27 | 2900 | 2.5 | 2.10E+10 | −1.4 | −8.1 | 45 |
| 28 | 3200 | 2.9 | 1.10E+10 | 5.2 | −13.8 | 2841 |
| 29 | 2800 | 2.5 | 2.50E+10 | −2.6 | −6.7 | 83 |
| 30 | 3200 | 2.9 | 1.00E+10 | −5.3 | −3.4 | 437 |
| 31 | 2800 | 2.5 | 3.10E+10 | 2.1 | −5.2 | 961 |
| 32 | 2800 | 2.4 | 1.30E+10 | −1.8 | −7.5 | 4028 |
| 33 | 3000 | 2.5 | 1.20E+10 | −3.5 | −2.7 | 3567 |
| 34 | 3500 | 2.9 | 2.00E+10 | 3.5 | −13.1 | 71 |
| 35 | 3500 | 2.9 | 2.10E+10 | 2.9 | −12.8 | 282 |
| 36 | 3400 | 2.8 | 1.90E+10 | 1.9 | −14.2 | 85 |
| 37 | 3400 | 2.8 | 1.60E+10 | 1.4 | −14.1 | 143 |
| 38* | 2900 | 2.4 | 8.00E+09 | −3.9 | −8.7 | 5705 |
| 39* | 2900 | 2.3 | 6.00E+09 | −4.9 | −10.2 | 3816 |
| 40* | 3900 | 3.8 | 1.10E+10 | 2.8 | −8.9 | 14962 |
| 41* | 2300 | 2.1 | 2.10E+10 | −1.4 | −3.6 | 792 |

1) BCG . . . {Baα, Ca (1-α)} SiO₃

The invention claimed is:

1. A dielectric ceramic composition comprising;
a dielectric main component composed of 86.32 to 97.64 mol % of $BaTiO_3$, 0.01 to 10.00 mol % of $Y_2O_3$ and 0.01 to 10.00 mol % MgO and 0.001 to 0.200 mol % $V_2O_5$,
0.01 to 1.0 mol % of more than one selected from the group consisting of MnO, $Cr_2O_3$, $Co_2O_3$,
0.5 to 10.0 mol % of a second additive which is {Baα, Ca (1−α)}$SiO_3$ (note, 0≦α≦1), and
Sr: 10 to 500 ppm
S: 10 to 50 ppm
Al: 10 to 50 ppm
Fe: 10 to 50 ppm
Zr: 100 to 800 ppm
Y: 10 to 100 ppm
Hf: 10 to 100 ppm
to 100 parts by weight of $BaTiO_3$.

* * * * *